US012254827B2

(12) United States Patent
Watsuda

(10) Patent No.: US 12,254,827 B2
(45) **Date of Patent: *Mar. 18, 2025**

(54) DISPLAY DEVICE

(71) Applicant: Innolux Corporation, Miaoli County (TW)

(72) Inventor: Hirofumi Watsuda, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/674,909

(22) Filed: May 26, 2024

(65) Prior Publication Data

US 2024/0312399 A1 Sep. 19, 2024

Related U.S. Application Data

(63) Continuation of application No. 18/177,774, filed on Mar. 3, 2023, now Pat. No. 12,039,921.

(51) Int. Cl.
*G09G 3/32* (2016.01)

(52) U.S. Cl.
CPC ....... *G09G 3/32* (2013.01); *G09G 2300/0426* (2013.01); *G09G 2300/0452* (2013.01)

(58) Field of Classification Search
CPC ......... G09G 3/2003; G09G 2300/0452; G09G 2300/0426; G09G 2300/0861
See application file for complete search history.

(56) References Cited

U.S. PATENT DOCUMENTS

2016/0104413 A1* 4/2016 Matsueda ............ G09G 3/3225 345/694
2016/0203748 A1* 7/2016 Matsueda ............ H10K 59/353 345/694
2020/0035156 A1* 1/2020 Yanase ................. G09G 3/3233
2020/0135092 A1* 4/2020 Ahmed ............... H01L 27/1214
2022/0028331 A1* 1/2022 Chaji .................. H05B 45/325

FOREIGN PATENT DOCUMENTS

CN 112652266 4/2021

OTHER PUBLICATIONS

"Search Report of Europe Counterpart Application", issued on Jul. 19, 2024, pp. 1-15.

* cited by examiner

*Primary Examiner* — Shaheda A Abdin
(74) *Attorney, Agent, or Firm* — JCIPRNET

(57) ABSTRACT

A display device is provided. The display device includes a first pixel, a first emission signal line and a second emission signal line. The first pixel includes a blue sub-pixel, a green sub-pixel and a red sub-pixel. The blue sub-pixel includes a first emission control switch. The green sub-pixel includes a second emission control switch. The red sub-pixel includes a third emission control switch. The first emission signal line is electrically connected to the first emission control switch and the second emission control switch. The second emission signal line is electrically connected to the third emission control switch.

19 Claims, 12 Drawing Sheets

200

DISPLAY DEVICE

CROSS-REFERENCE TO RELATED APPLICATION

This application is a continuation application of and claims the priority benefit of U.S. application Ser. No. 18/177,774, filed on Mar. 3, 2023. The entirety of the above-mentioned patent application is hereby incorporated by reference herein and made a part of this specification.

BACKGROUND

Technical Field

The disclosure relates a device, particularly, the disclosure relates to a display device.

Description of Related Art

In general, each pixel of a light emitting diode (LED) display device may consist of a red sub-pixel, a green sub-pixel and a blue sub-pixel. The lighting efficiencies of the red sub-pixel, the green sub-pixel and the blue sub-pixel depend on the current density and the duty ration of the corresponding driving current. However, since the variation trends between the luminous efficiencies and the current density and/or the duty cycle of the corresponding driving current of the red sub-pixel, the green sub-pixel and the blue sub-pixel may be different, so how to optimize the luminous efficiencies of different sub-pixels is an important topic in this field.

SUMMARY

The display device of the disclosure includes a first pixel, a first emission signal line and a second emission signal line. The first pixel includes a blue sub-pixel, a green sub-pixel and a red sub-pixel. The blue sub-pixel includes a first emission control switch. The green sub-pixel includes a second emission control switch. The red sub-pixel includes a third emission control switch. The first emission signal line is electrically connected to the first emission control switch and the second emission control switch. The second emission signal line is electrically connected to the third emission control switch.

Based on the above, according to the display device of the disclosure, the display device may achieve good luminous efficiency and may effectively save the number of emission signal lines.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
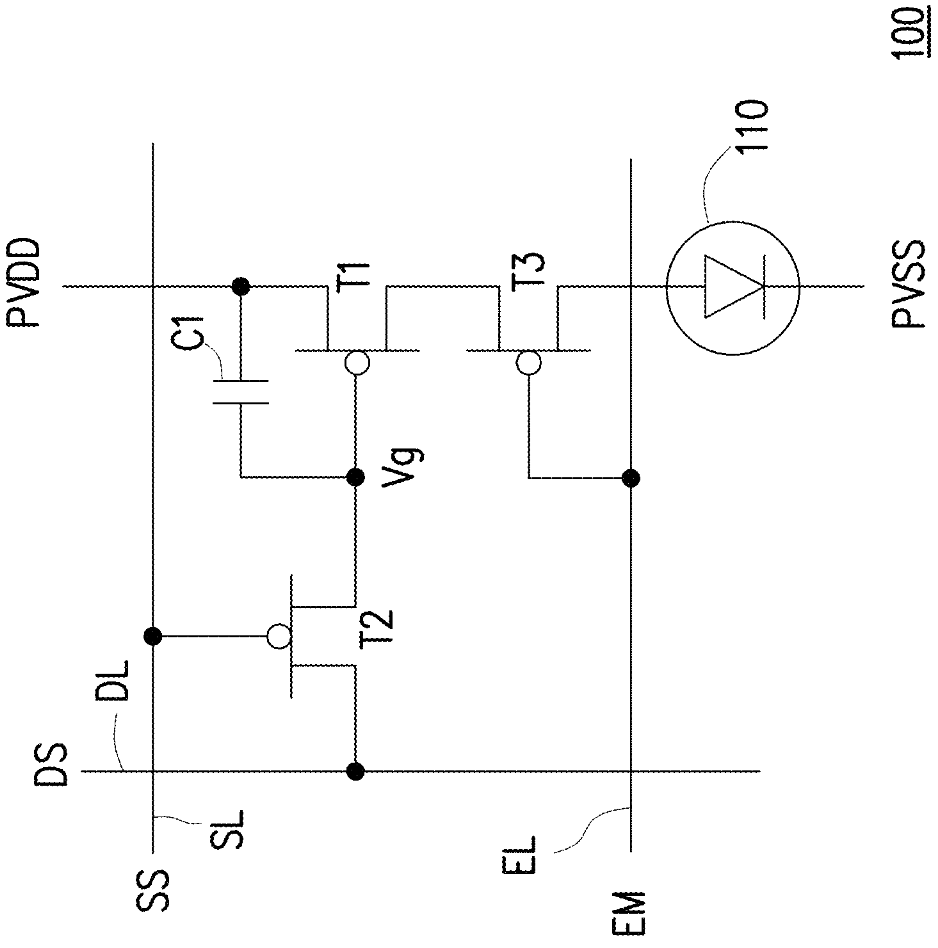
FIG. 1A is a circuit schematic diagram of a sub-pixel according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as “comprise” and “include” are open-ended terms, and should be explained as “including but not limited to . . . ”.

The term “coupling (or connection)” used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms “first”, “second”, and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

The display device of the disclosure may be an active matrix light emitting diode (AM-LED) display device, but the disclosure is not limited thereto. In some embodiment of the disclosure, the display device of the disclosure may, for example, be adapted to a liquid crystal, a light emitting diode, a quantum dot (QD), a fluorescence, a phosphor, other suitable display medium, or the combination of the aforementioned material, but the disclosure is not limited thereto. The light emitting diode may include, for example, organic light emitting diode (OLED), sub-millimeter light emitting diode (Mini LED), micro light emitting diode (Micro LED), or quantum dot light emitting diode (QLED or QDLED) or other suitable materials. The materials may be arranged and combined arbitrarily, but the disclosure is not limited to thereto. The display device of the disclosure may include peripheral systems such as driving system, control system, light source system, shelf system, and the like to support the light emitting device.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

FIG. 1A is a circuit schematic diagram of a sub-pixel according to an embodiment of the disclosure. Referring to FIG. 1A, the sub-pixel of following embodiments of the disclosure may be implemented as the sub-pixel 100 of FIG. 1A, but the disclosure is not limited thereto. In the embodiment of the disclosure, the sub-pixel 100 may include a driving switch T1, a data scan switch T2, an emission control switch T3, a storage capacitor C1 and a light-emitting unit 110. A first electrode of the data scan switch T2 is electrically connected to a data signal line DL. A gate electrode of the data scan switch T2 is electrically connected to a scan signal line SL. A second electrode of the data scan switch T2 is electrically connected to a gate electrode of the driving switch T1. A first electrode of the driving switch T1 is electrically connected to a first operation voltage PVDD. A second electrode of the driving switch T1 is electrically connected to a first electrode of the emission control switch T3. A gate electrode of the emission control switch T3 is electrically connected to an emission signal line EL. A second electrode of the emission control switch T3 is electrically connected to a first electrode of the light-emitting unit 110. A second electrode of the light-emitting unit 110 is electrically connected to a second operation voltage PVSS. A first electrode of the storage capacitor C1 is electrically connected to the first electrode of the driving switch T1. A second electrode of the storage capacitor C1 is electrically connected to the gate electrode of the driving switch T1.

In the embodiment of the disclosure, the driving switch T1, the data scan switch T2 and the emission control switch T3 are p-type transistors, but the disclosure is not limited thereto. In one embodiment of the disclosure, the driving switch T1, the data scan switch T2 and the emission control switch T3 may be n-type transistors. The first electrode and the second electrode of the above switches may be a source electrode and a drain electrode respectively. In the embodiment of the disclosure, the light-emitting unit 110 may be, for example, a LED, an OLED, a mini LED, a micro LED or a QLED, but the disclosure is not limited thereto.

In the embodiment of the disclosure, the data line DL may be configured to provide a data signal DS to the first electrode of the data scan switch T2. The scan signal line SL may be configured to provide a scan signal SS to the gate electrode of the data scan switch T2. The emission signal line EL may be configured to provide an emission signal EM to the gate electrode of the emission control switch T3.

Figure 1B:
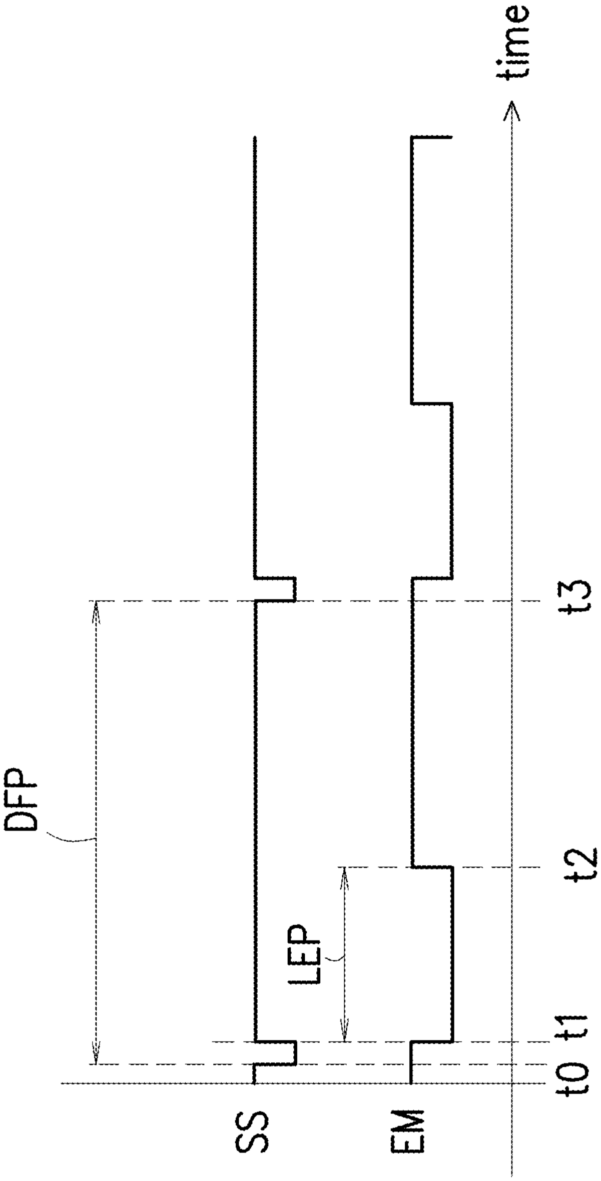
FIG. 1B is a timing diagram of an emission signal and a scan signal according to an embodiment of the disclosure.

FIG. 1B is a timing diagram of an emission signal and a scan signal according to an embodiment of the disclosure. Referring to FIG. 1A and FIG. 1B, during a frame period DFP from time t0 to time t3, the scan signal SS has a pulse (pull down pulse) to turned-on the data scan switch T2 during the period from time t0 to time t1. At the same time, the data line DL may provide the data signal DS, so that the data scan switch T2 transmits the data signal DS to the storage capacitor C1 according to the scan signal SS, and the storage capacitor C1 stores a data voltage Vg and holds the data voltage Vg at the gate electrode of the driving switch T1 according to the data signal DS. Thus, the driving switch T1 may provide a driving current according to the first operation voltage PVDD and the data voltage Vg. During a light emission period LEP from time t1 to time t2, the emission signal EM has a pulse (pull down pulse) to turned-on the emission control switch T3, so that the emission control switch T3 provides the driving current to drive the light-emitting unit 110. In the embodiment of the disclosure, the luminous brightness of light-emitting unit 110 is proportional to the time length of the light emission period LEP. In addition, the turned-on period of the data scan switch T2 is non-overlapped with the turned-on period of the emission control switch T3.

Figure 2:
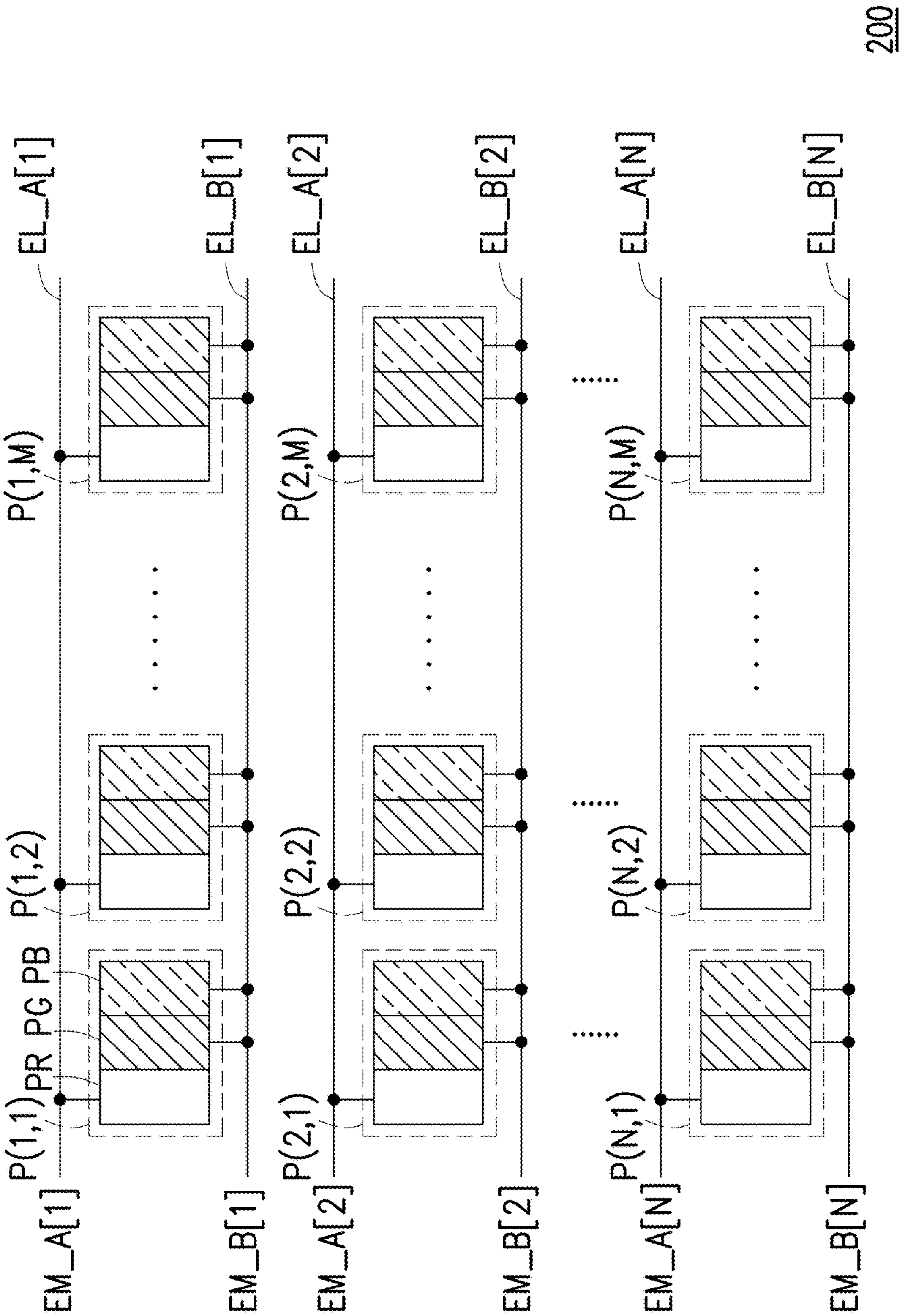
FIG. 2 is a circuit schematic diagram of a display device according to an embodiment of the disclosure.

FIG. 2 is a circuit schematic diagram of a display device according to an embodiment of the disclosure. Referring to FIG. 2, the display device 200 may include a pixel array and related drivers, and further include a plurality of emission signal lines, a plurality of scan signal lines and a plurality of data lines. In the embodiment of the disclosure, the pixel array may include a plurality of pixels P(1,1) to P(N,M), and the pixels P(1,1) to P(N,M) are electrically connected to a plurality of emission signal lines EL_A[1] to EL_A[N] and EL_B[1] to EL_B[N], where N and M are positive integers. The plurality of emission signal lines EL_A[1] to EL_A[N] and EL_B[1] to EL_B[N] are configured to provide a plurality of emission signals EM_A[1] to EM_A[N] and EM_B[1] to EM_B[N]. Each row of the pixels P(1,1) to P(N,M) may be electrically connected to the two same emission signal lines, and may be electrically connected to the same scan line. Each column of the pixel array may be electrically connected to the same data line. For example, the pixels P(1,1) to P(1,M) of the first row are electrically connected to the emission signal line EL_A[1] and the emission signal line EL_B[1]. The pixels P(2,1) to P(2,M) of second row are electrically connected to the emission signal line EL_A[2] and the emission signal line EL_B[2]. The pixels P(N,1) to P(N,M) of the N-th row are electrically connected to the emission signal line EL_A[N] and the emission signal line EL_B[N].

In the embodiment of the disclosure, the pixel P(1,1) includes a blue sub-pixel PB, a green sub-pixel PG and a red sub-pixel PR, and other pixels may be deduced accordingly. Moreover, the blue sub-pixel PB, the green sub-pixel PG and the red sub-pixel PR may be respectively implemented as the circuit architecture of the sub-pixel 100 of FIG. 1A. The following description will use the pixel P(1,1) as an example. The emission signal line EL_B[1] may be electrically connected to the emission control switch of the blue sub-pixel PB and the emission control switch of the green sub-pixel PG. The emission signal line EL_A[1] may be electrically connected to the emission control switch of the red sub-pixel PR.

Figure 3:
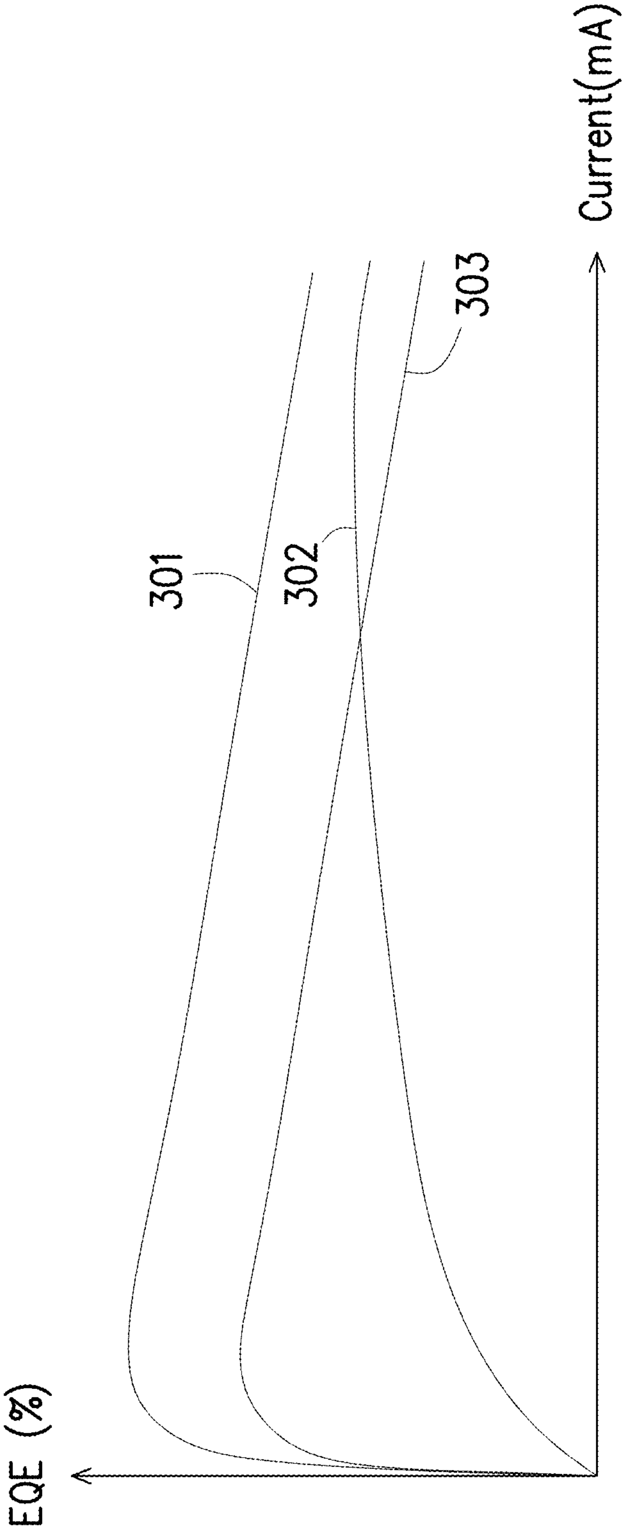
FIG. 3 is a schematic diagram of an external quantum efficiencies of red, green and blue sub-pixels according to an embodiment of the disclosure.

FIG. 3 is a schematic diagram of an external quantum efficiencies of red, green and blue sub-pixels according to an embodiment of the disclosure. Referring to FIG. 2 and FIG. 3, the light-emitting unit of the blue sub-pixel PB may satisfy the external quantum efficiency (EQE) variation trend of the variation curve 301. The light-emitting unit of the green sub-pixel PG may satisfy the external quantum efficiency variation trend of the variation curve 302. The light-emitting unit of the red sub-pixel PR may satisfy the external quantum efficiency variation trend of the variation curve 303. According to variation curve 301 and 302, the light-emitting units of the blue sub-pixel PB and the green sub-pixel PG may have similar external quantum efficiency variation trend. According to variation curve 301 and 303, the light-emitting units of the blue sub-pixel PB and the red sub-pixel PR may have opposite external quantum efficiency variation trends. According to variation curve 302 and 303, the light-emitting units of the green sub-pixel PG and the red sub-pixel PR may have opposite external quantum efficiency variation trends.

Specifically, when the driving currents received by the light-emitting units of the blue sub-pixel PB and the green sub-pixel PG are larger, the light-emitting units of the external quantum efficiencies of the blue sub-pixel PB and green sub-pixel PG are lower. The difference is that when the driving current received by the light-emitting unit of the red sub-pixel PR is larger, the light-emitting unit of the external quantum efficiency of the red sub-pixel PR is higher.

That is, if the driving currents of the light-emitting units of the blue sub-pixel PB and the green sub-pixel PG are reduced, and the emission duties of the light-emitting units of the blue sub-pixel PB and the green sub-pixel PG are increased, the external quantum efficiencies of the light-emitting units of the blue sub-pixel PB and the green sub-pixel PG may be effectively improved. If the driving current of the light-emitting unit of the red sub-pixel PR is increased, and the emission duty of the light-emitting unit of the red sub-pixel PR is reduced, the external quantum efficiencies of the light-emitting unit of the red sub-pixel PR may be effectively improved.

Accordingly, in the embodiment of the disclosure, the blue sub-pixel PB and the green sub-pixel PG are connected to the same emission signal line EL_B[1] to receive the emission signal EM_B[1]. The red sub-pixel PA is electrically connected to the emission signal line EL_A[1] to receive the emission signal EM_A[1]. Specifically, the emission signal line EL_B[1] is configured to provide the emission signal EM_B[1] to gate electrodes of the emission control switch and the emission control switch of the blue sub-pixel PB and the green sub-pixel PG, and the emission signal line EL_A[1] is configured to provide the emission signal EM_A[1] to a gate electrode of the emission control switch of the red sub-pixel PR. Thus, the emission signal EM_A[1] and the emission signal EM_B[1] may use the different light emission duties to improve the power consumption of the blue sub-pixel PB, the green sub-pixel PG and the red sub-pixel PR respectively. On the other hand, due to the blue sub-pixel and the green sub-pixel in each pixel of the display device 200 may be applied the common light emission duty through the same emission signal line, the complexity of signal wiring of the display device 200 may be efficiently improved.

Figure 4A:
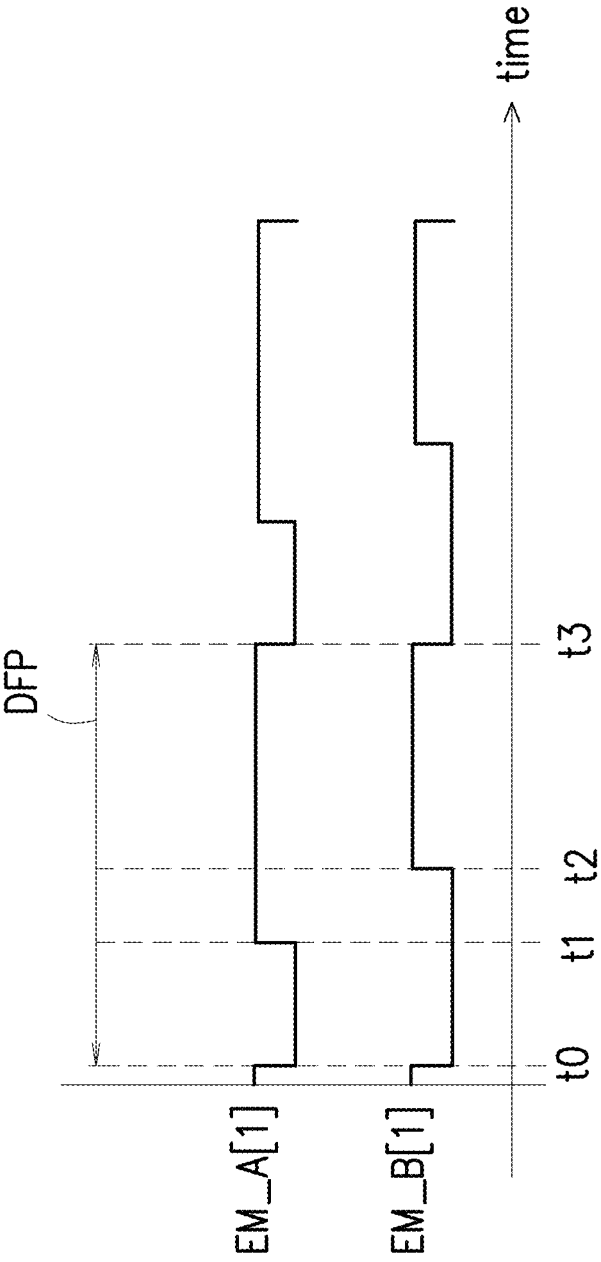
FIG. 4A is a timing diagram of emission signals according to an embodiment of the disclosure.

FIG. 4A is a timing diagram of emission signals according to an embodiment of the disclosure. Referring to FIG. 2 and FIG. 4A, the pulse timings of the emission signal EM_A[1] and the emission signal EM_B[1] may be shown as FIG. 4A. In the embodiment of the disclosure, the gate electrodes of the emission control switch of the blue sub-pixel PB and the emission control switch of the green sub-pixel PG may receive the emission signal EM_B[1] from the emission signal line EL_B[1], and the gate electrode of the emission control switch of the red sub-pixel PR may receive the emission signal EM_A[1] from the emission signal line EL_A[1].

During the frame period DFP from time t0 to time t3, the emission signal EM_A[1] may have a pulse (pull down pulse) from time t0 to time t1, so that the emission control switch of the red sub-pixel PR may be turned-on to provide the driving current to the light-emitting unit of the red sub-pixel PR. During the period from time t1 to time t3, the emission signal EM_A[1] may be maintained at a high voltage level, so that the emission control switch of the red sub-pixel PR may be turned-off. And, the emission signal EM_B[1] may have a pulse (pull down pulse) from time t0 to time t2, so that the emission control switch of the blue sub-pixel PB and the emission control switch of the green sub-pixel PG may be turned-on to provide the driving currents to the light-emitting units of the blue sub-pixel PB and the green sub-pixel PG. During the period from time t2 to time t3, the emission signal EM_B[1] may be maintained at the high voltage level, so that the emission control switch of the blue sub-pixel PB and the emission control switch of the green sub-pixel PG may be turned-off.

In the embodiment of the disclosure, due to the light emission period (from time t0 to time t2) of the emission signal EM_B[1] is longer than the light emission period (from time t0 to time t1) of the emission signal EM_A[1], a duty ratio of the emission signal EM_B[1] is greater than a duty ratio of the second emission signal EM_A[1]. Moreover, in the embodiment of the disclosure, the emission signal EM_A[1] and the emission signal EM_B[1] may have different pulses starting at a same time t0.

Figure 4B:
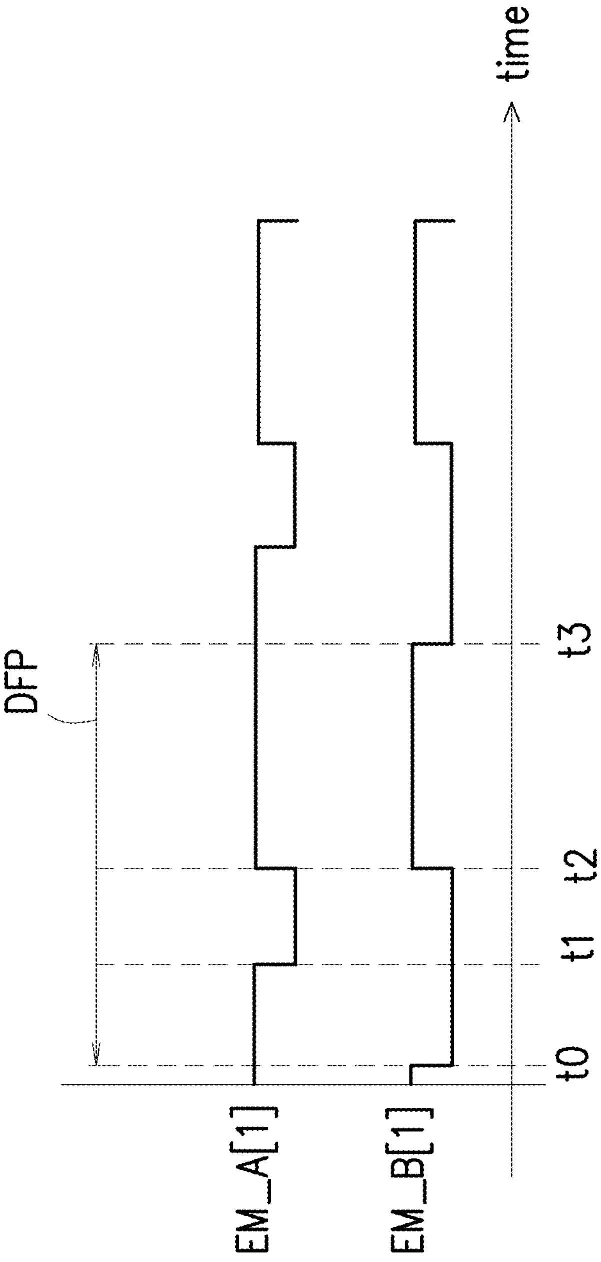
FIG. 4B is a timing diagram of emission signals according to another embodiment of the disclosure.

FIG. 4B is a timing diagram of emission signals according to another embodiment of the disclosure. Referring to FIG. 2 and FIG. 4B, the pulse timings of the emission signal EM_A[1] and the emission signal EM_B[1] may be shown as FIG. 4B. In the embodiment of the disclosure, the gate electrodes of the emission control switch of the blue sub-pixel PB and the emission control switch of the green sub-pixel PG may receive the emission signal EM_B[1] from the emission signal line EL_B[1], and the gate electrode of the emission control switch of the red sub-pixel PR may receive the emission signal EM_A[1] from the emission signal line EL_A[1].

During the frame period DFP from time t0 to time t3, the emission signal EM_A[1] may have a pulse (pull down pulse) from time t1 to time t2, so that the emission control switch of the red sub-pixel PR may be turned-on to provide the driving current to the light-emitting unit of the red sub-pixel PR. During the period from time t0 to time t1 and the period from time t2 to time t3, the emission signal EM_A[1] may be maintained at the high voltage level respectively, so that the emission control switch of the red sub-pixel PR may be turned-off. And, the emission signal EM_B[1] may have a pulse (pull down pulse) from time t0 to time t2, so that the emission control switch of the blue sub-pixel PB and the emission control switch of the green sub-pixel PG may be turned-on to provide the driving currents to the light-emitting units of the blue sub-pixel PB and the green sub-pixel PG. During the period from time t2 to time t3, the emission signal EM_B[1] may be maintained at the high voltage level, so that the emission control switch of the blue sub-pixel PB and the emission control switch of the green sub-pixel PG may be turned-off.

In the embodiment of the disclosure, due to the light emission period (from time t0 to time t2) of the emission signal EM_B[1] is longer than the light emission period (from time t1 to time t2) of the emission signal EM_A[1], the duty ratio of the emission signal EM_B[1] is greater than the duty ratio of the second emission signal EM_A[1]. Moreover, in the embodiment of the disclosure, the emission signal EM_A[1] and the emission signal EM_B[1] may have different pulses ending at a same time t2.

Figure 4C:
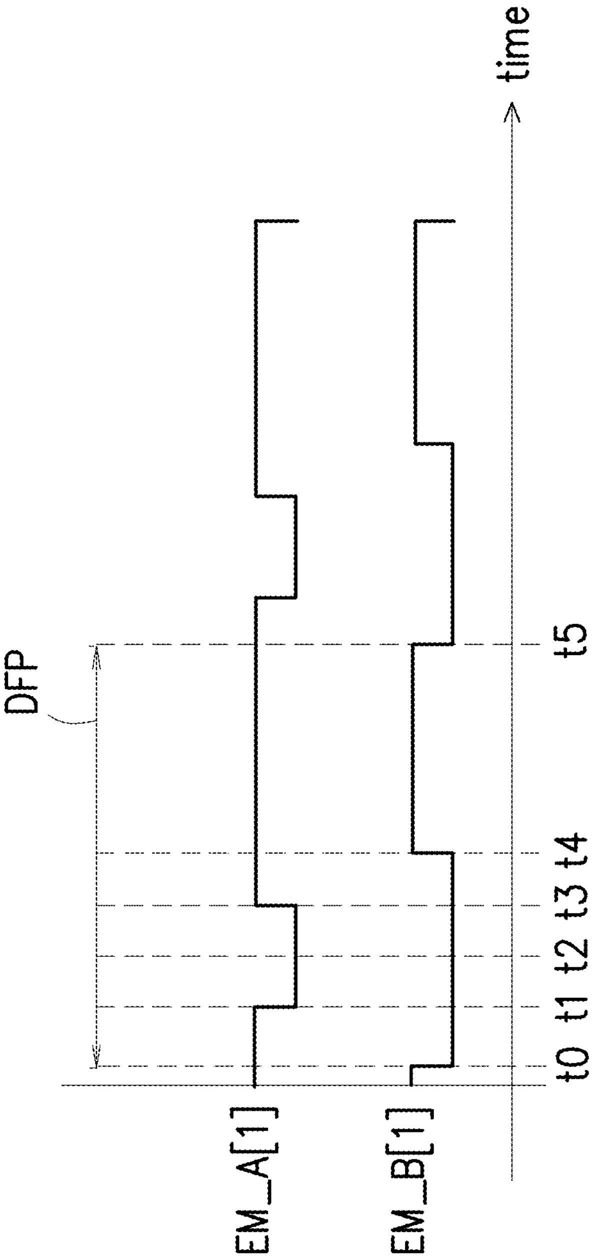
FIG. 4C is a timing diagram of emission signals according to another embodiment of the disclosure.

FIG. 4C is a timing diagram of emission signals according to another embodiment of the disclosure. Referring to FIG. 2 and FIG. 4C, the pulse timings of the emission signal EM_A[1] and the emission signal EM_B[1] may be shown as FIG. 4C. In the embodiment of the disclosure, the gate electrodes of the emission control switch of the blue sub-pixel PB and the emission control switch of the green sub-pixel PG may receive the emission signal EM_B[1] from the emission signal line EL_B[1], and the gate electrode of the emission control switch of the red sub-pixel PR may receive the emission signal EM_A[1] from the emission signal line EL_A[1].

During the frame period DFP from time t0 to time t5, the emission signal EM_A[1] may have a pulse (pull down pulse) from time t1 to time t3, so that the emission control switch of the red sub-pixel PR may be turned-on to provide the driving current to the light-emitting unit of the red sub-pixel PR. During the period from time t0 to time t1 and the period from time t3 to time t5, the emission signal EM_A[1] may be maintained at the high voltage level respectively, so that the emission control switch of the red sub-pixel PR may be turned-off. And, the emission signal EM_B[1] may have a pulse (pull down pulse) from time t0 to time t4, so that the emission control switch of the blue sub-pixel PB and the emission control switch of the green sub-pixel PG may be turned-on to provide the driving currents to the light-emitting units of the blue sub-pixel PB and the green sub-pixel PG. During the period from time t4 to time t5, the emission signal EM_B[1] may be maintained at the high voltage level, so that the emission control switch of the blue sub-pixel PB and the emission control switch of the green sub-pixel PG may be turned-off.

In the embodiment of the disclosure, due to the light emission period (from time t0 to time t4) of the emission signal EM_B[1] is longer than the light emission period (from time t1 to time t3) of the emission signal EM_A[1], the duty ratio of the emission signal EM_B[1] is greater than the duty ratio of the second emission signal EM_A[1]. Moreover, in the embodiment of the disclosure, the emission signal EM_A[1] and the emission signal EM_B[1] may have different pulses with a same centering time t2.

Figure 4D:
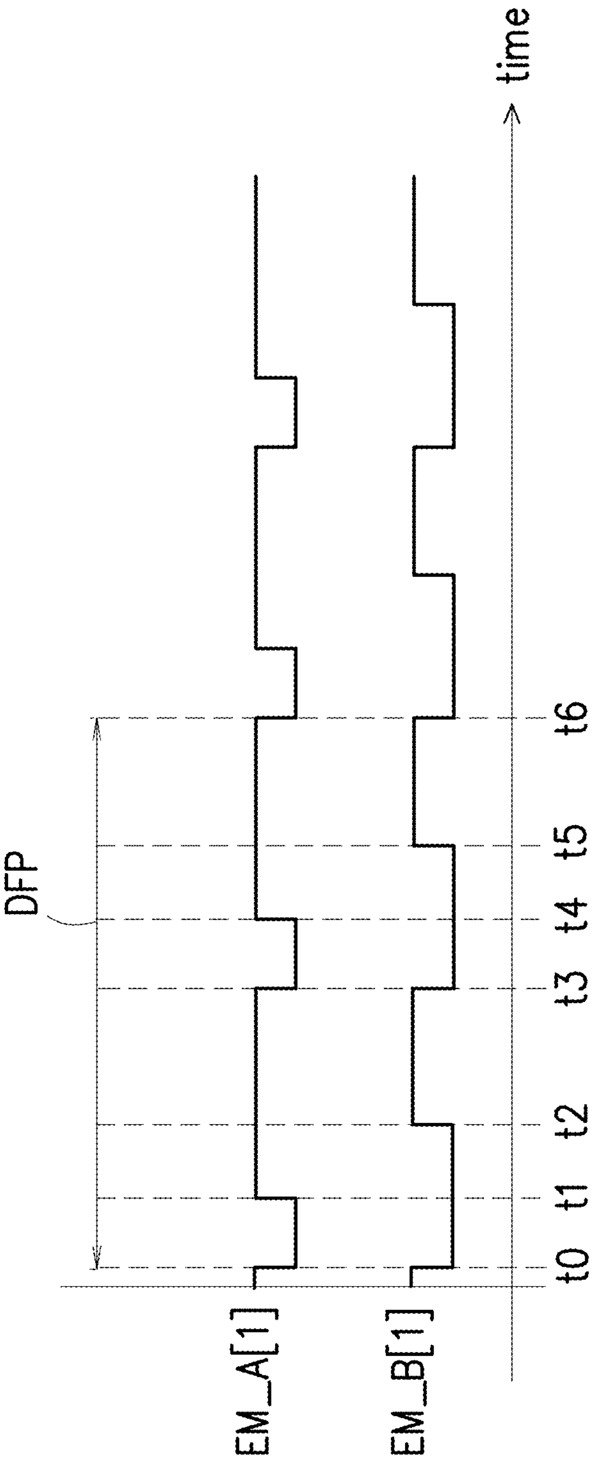
FIG. 4D is a timing diagram of emission signals according to another embodiment of the disclosure.

FIG. 4D is a timing diagram of emission signals according to another embodiment of the disclosure. Referring to FIG. 2 and FIG. 4D, the pulse timings of the emission signal EM_A[1] and the emission signal EM_B[1] may be shown as FIG. 4D. In the embodiment of the disclosure, the gate electrodes of the emission control switch of the blue sub-pixel PB and the emission control switch of the green sub-pixel PG may receive the emission signal EM_B[1] from the emission signal line EL_B[1], and the gate electrode of the emission control switch of the red sub-pixel PR may receive the emission signal EM_A[1] from the emission signal line EL_A[1].

During the frame period DFP from time t0 to time t6, the emission signal EM_A[1] may have multiple sub-pulses (pull down pulse), so that the emission control switch of the red sub-pixel PR may be turned-on in time division. Taking dual pulse as an example, during the period from time t0 to time t1 and the period from time t3 to time t4, the emission control switch of the red sub-pixel PR may be turned-on in time division to provide the driving current to the light-emitting unit of the red sub-pixel PR. During the period from time t1 to time t3 and the period from time t4 to time t6, the emission signal EM_A[1] may be maintained at the high voltage level respectively, so that the emission control switch of the red sub-pixel PR may be turned-off. And, the emission signal EM_B[1] may have multiple sub-pulses (pull down pulse), so that the emission control switch of the blue sub-pixel PB and the emission control switch of the green sub-pixel PG may be turned-on in time division. Taking dual pulse as an example, during the period from time t0 to time t2 and the period from time t3 to time t5, the emission control switch of the blue sub-pixel PB and the emission control switch of the green sub-pixel PG may be turned-on in time division to provide the driving currents to the light-emitting units of the blue sub-pixel PB and the green sub-pixel PG. During the period from time t2 to time t3 and the period from time t5 to time t6, the emission signal EM_B[1] may be maintained at the high voltage level respectively, so that the emission control switch of the blue sub-pixel PB and the emission control switch of the green sub-pixel PG may be turned-off.

In the embodiment of the disclosure, due to the total light emission period (the period from time t0 to time t2 plus the period from time t3 to time t5) of the emission signal EM_B[1] is longer than the total light emission period (the period from time t0 to time t1 plus the period from time t3 to time t4) of the emission signal EM_A[1], the duty ratio of the emission signal EM_B[1] is greater than the duty ratio of the second emission signal EM_A[1]. Moreover, in the embodiment of the disclosure, the emission signal EM_A[1] and the emission signal EM_B[1] may have different multiple pulses starting at the same time t0 and time t3 respectively.

Figure 4E:
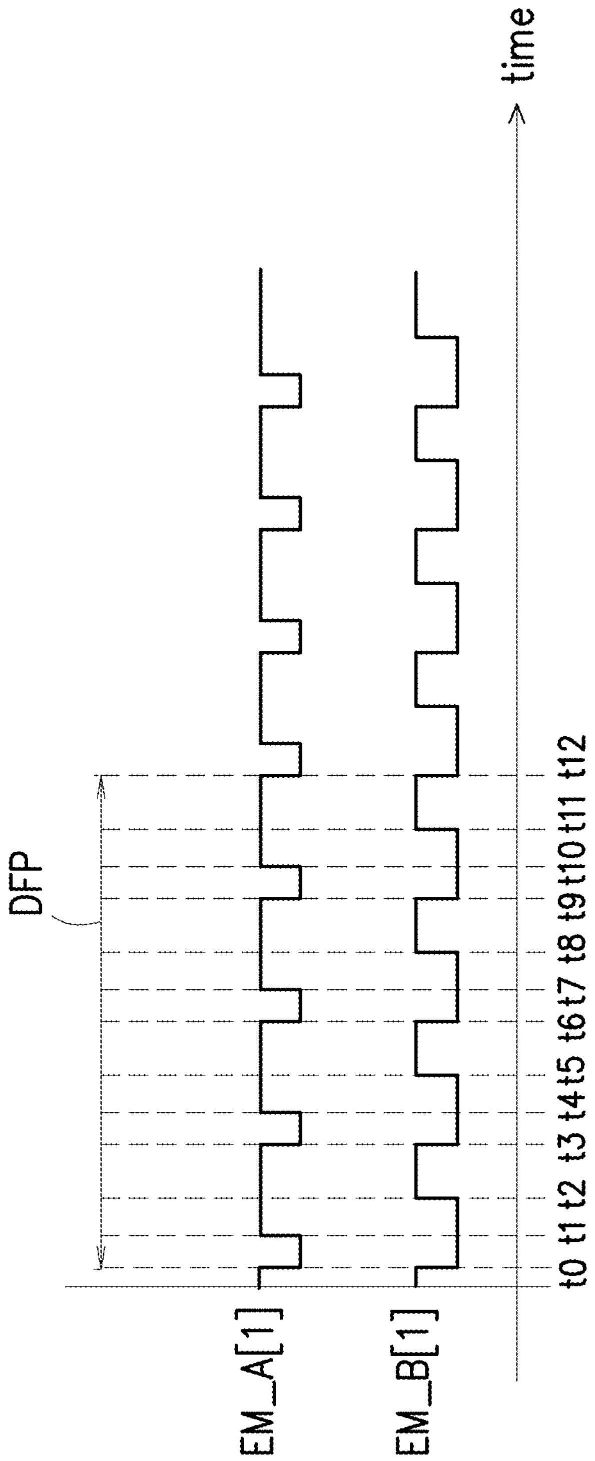
FIG. 4E is a timing diagram of emission signals according to another embodiment of the disclosure.

FIG. 4E is a timing diagram of emission signals according to another embodiment of the disclosure. Referring to FIG. 2 and FIG. 4E, the pulse timings of the emission signal EM_A[1] and the emission signal EM_B[1] may be shown as FIG. 4E. In the embodiment of the disclosure, the gate electrodes of the emission control switch of the blue sub-pixel PB and the emission control switch of the green sub-pixel PG may receive the emission signal EM_B[1] from the emission signal line EL_B[1], and the gate electrode of the emission control switch of the red sub-pixel PR may receive the emission signal EM_A[1] from the emission signal line EL_A[1].

During the frame period DFP from time t0 to time t12, the emission signal EM_A[1] may have multiple sub-pulses (pull down pulse), so that the emission control switch of the red sub-pixel PR may be turned-on in time division. Taking quad pulse as an example, during the period from time t0 to time t1, the period from time t3 to time t4, the period from time t6 to time t7 and the period from time t9 to time t10, the emission control switch of the red sub-pixel PR may be turned-on in time division to provide the driving current to the light-emitting unit of the red sub-pixel PR. During the period from time t1 to time t3, the period from time t4 to time t6, the period from time t7 to time t9 and the period from time t10 to time t12, the emission signal EM_A[1] may be maintained at the high voltage level respectively, so that the emission control switch of the red sub-pixel PR may be turned-off. And, the emission signal EM_B[1] may have multiple sub-pulses (pull down pulse), so that the emission control switch of the blue sub-pixel PB and the emission control switch of the green sub-pixel PG may be turned-on in time division. Taking quad pulse as an example, during the period from time t0 to time t2, the period from time t3 to time t5, the period from time t6 to time t8 and the period from time t9 to time t11, the emission control switch of the blue sub-pixel PB and the emission control switch of the green sub-pixel PG may be turned-on in time division to provide the driving currents to the light-emitting units of the blue sub-pixel PB and the green sub-pixel PG. During the period from time t2 to time t3, the period from time t5 to time t6, the period from time t8 to time t9 and the period from time t11 to time t12, the emission signal EM_B[1] may be maintained at the high voltage level respectively, so that the emission control switch of the blue sub-pixel PB and the emission control switch of the green sub-pixel PG may be turned-off.

In the embodiment of the disclosure, due to the total light emission period (the period from time t0 to time t2 plus the period from time t3 to time t5, plus the period from time t6 to time t8, and plus the period from time t9 to time t11) of the emission signal EM_B[1] is longer than the total light emission period (the period from time t0 to time t1 plus the period from time t3 to time t4, plus the period from time t0 to time t7, and plus the period from time t9 to time t10) of the emission signal EM_A[1], the duty ratio of the emission signal EM_B[1] is greater than the duty ratio of the second emission signal EM_A[1]. Moreover, in the embodiment of the disclosure, the emission signal EM_A[1] and the emission signal EM_B[1] may have different multiple pulses starting at the same time t0, time t3, time t6 and time t9 respectively.

Figure 5:
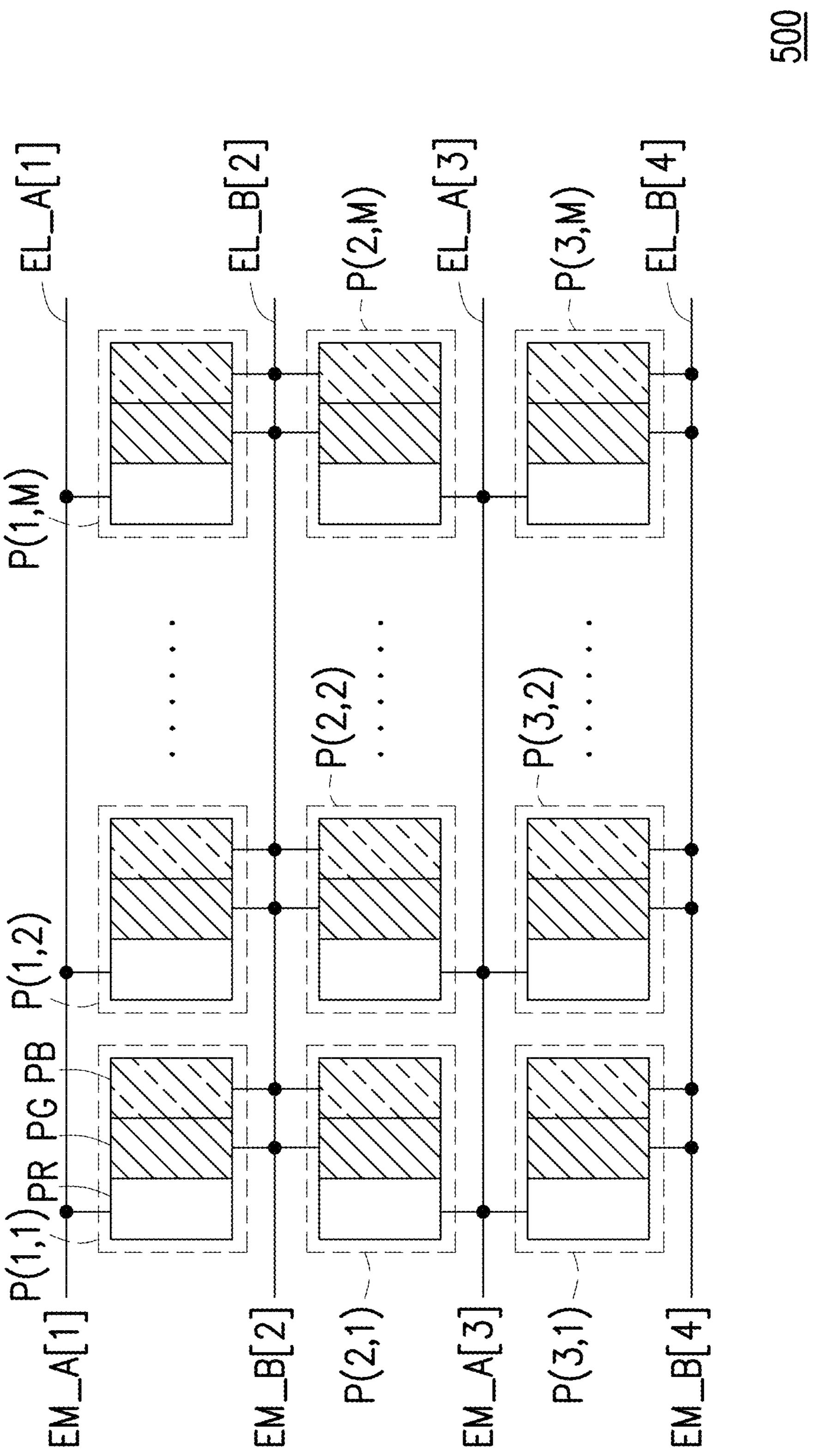
FIG. 5 is a circuit schematic diagram of a display device according to another embodiment of the disclosure.

FIG. 5 is a circuit schematic diagram of a display device according to another embodiment of the disclosure. Referring to FIG. 5, in the embodiment of the disclosure, the display device 500 may include a pixel array and related drivers, and further include a plurality of emission signal lines, a plurality of scan signal lines and a plurality of data lines. The pixel array includes a plurality of pixels, and the pixels are electrically connected to the emission signal lines, the scan signal lines and the data lines respectively. Taking three rows of the pixel array as an example, the plurality of emission signal lines EL_A[1], EL_B[2], EL_A[3] and EL_B[4] are configured to provide the emission signals EM_A[1], EM_B[2], EM_A[3] and EM_B[4]. Each row of the pixels may be electrically connected to the same data line, and the adjacent rows of the pixels may be electrically connected to the same emission signal line. For example, as shown in FIG. 5, the first row and the second row of the pixels are electrically connected to the emission signal line EL_B[2], and the second row and the third row of the pixels are electrically connected to the emission signal line EL_A [3]. Moreover, the coupling manners of pixels in other rows and corresponding emission signal lines may be deduced accordingly.

In the embodiment of the disclosure, the pixel P(1,1) includes a blue sub-pixel PB, a green sub-pixel PG and a red sub-pixel PR, and other pixels may be deduced accordingly. Moreover, the blue sub-pixel PB, the green sub-pixel PG and the red sub-pixel PR may be respectively implemented as the circuit architecture of the sub-pixel 100 of FIG. 1A. The following description will use the pixels P(1,1), P(2,1) and P(3,1) as an example. In the embodiment of the disclosure, the emission signal line EL_B[2] may be electrically connected to the emission control switches of the blue sub-pixels PB of the pixel P(1,1) and the pixel P(2,1) and the emission control switches of the green sub-pixels PG of the pixel P(1,1) and the pixel P(2,1). The emission signal line EL_A[1] may be electrically connected to the emission control switch of the red sub-pixel PR of the pixel P(1,1). The emission signal line EL_A[3] may be electrically connected to the emission control switches of the red sub-pixels PR of the pixel P(2,1) and the pixel P(3,1). The emission signal line EL_B[4] may be electrically connected to the emission control switches of the blue sub-pixels PB of the pixel P(3,1) and the pixel (P(4,1)) of adjacent row and the emission control switches of the green sub-pixels PG of the pixel P(3,1) and the pixel (P(4,1)) of adjacent row. Moreover, the coupling manners of sub-pixels in other adjacent rows and corresponding emission signal lines may be deduced accordingly.

Figure 6:
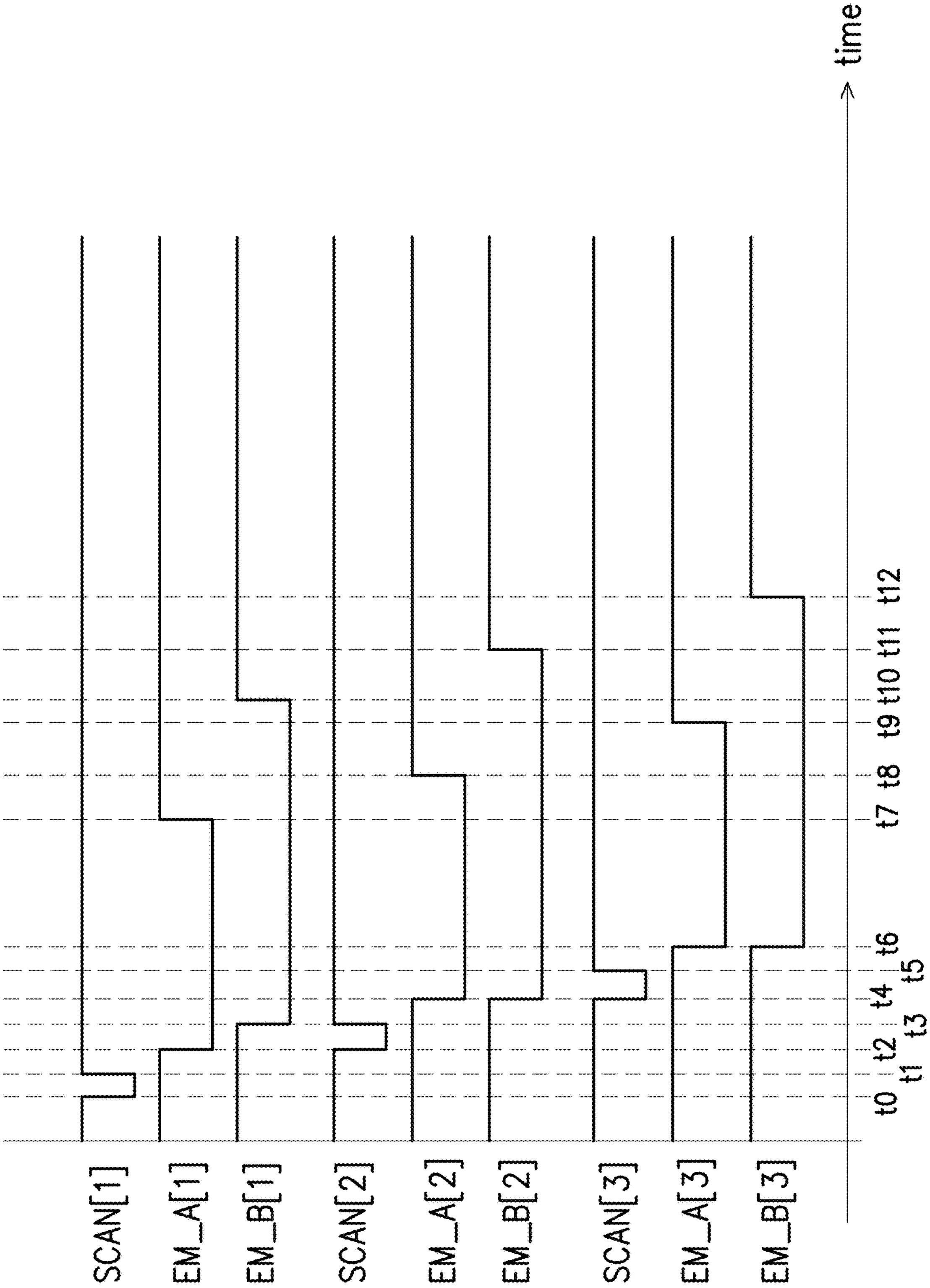
FIG. 6 is a timing diagram of emission signals and scan signals according to an embodiment of the disclosure.

FIG. 6 is a timing diagram of emission signals and scan signals according to an embodiment of the disclosure. The emission signals and the scan signals of FIG. 6 may be applied to the display device 200 of FIG. 2 and the display device 500 of FIG. 5. The display device 200 of FIG. 2 needs to be applied with the all emission signals of FIG. 6, but the display device 500 of FIG. 5 merely needs to be applied with a part of the emission signals of FIG. 6. However, the manner of applying the all emission signals of FIG. 6 to the display device 200 of FIG. 2 may be deduced by referring to the description of the above embodiment, and will not be repeated here.

Referring to FIG. 5 and FIG. 6, in the embodiment of the disclosure, the pixels P(1,1), P(2,1) and P(3,1) are electrically connected to a first scan signal line, a second scan signal line and a third scan signal line respectively. The data scan switches of the blue sub-pixel PB, the green sub-pixel PG and the red sub-pixel PR of the pixel P(1,1) are electrically connected to the first scan signal line. The data scan switches of the blue sub-pixel PB, the green sub-pixel PG and the red sub-pixel PR of the pixel P(2,1) are electrically connected to the second scan signal line. The data scan switches of the blue sub-pixel PB, the green sub-pixel PG and the red sub-pixel PR of the pixel P(3,1) are electrically connected to the third scan signal line.

In the embodiment of the disclosure, the first scan signal line is configured to provide a scan signal SCAN[1] to the gate electrode of the data scan switches of the blue sub-pixel PB, the green sub-pixel PG and the red sub-pixel PR of the pixel P(1,1). The second scan signal line is configured to provide a scan signal SCAN[2] to the gate electrode of the data scan switches of the blue sub-pixel PB, the green sub-pixel PG and the red sub-pixel PR of the pixel P(2,1). The third scan signal line is configured to provide a scan signal SCAN[3] to the gate electrode of the data scan switches of the blue sub-pixel PB, the green sub-pixel PG and the red sub-pixel PR of the pixel P(2,1).

In the embodiment of the disclosure, the emission signal line EL_B[2] is configured to provide the emission signal EM_B[2] to the emission control switches of the blue sub-pixels PB of the pixel P(1,1) and the pixel P(2,1) and the emission control switches of the green sub-pixels PG of the pixel P(1,1) and the pixel P(2,1). As shown in FIG. 6, during a frame period, a pulse (pull down pulse) of the emission signal EM_B[2] is later than pulses (pull down pulse) of the scan signal SCAN[1] and the scan signal SCAN[2]. Specifically, the scan signal SCAN[1] has the pulse from time t0 to time t1, so that the data scan switches of the blue sub-pixel PB and the green sub-pixel PG of the pixel P(1,1) may be turned-on, and the storage capacitors of the blue sub-pixel PB and the green sub-pixel PG of the pixel P(1,1) may receive and store the data voltages according to corresponding data signals provided by the corresponding data lines respectively. The scan signal SCAN[2] has the pulse from time t2 to time t3, so that the data scan switches of the blue sub-pixel PB and the green sub-pixel PG of the pixel P(2,1) may be turned-on, and the storage capacitors of the blue sub-pixel PB and the green sub-pixel PG of the pixel P(2,1) may receive and store the corresponding data voltages according to corresponding data signals provided by the corresponding data lines respectively. That is, the pulse of the scan signal SCAN[2] is later than the pulse of the scan signal SCAN[1]. Then, the emission signal EM_B[2] may have the pulse from time t4 to time t11, so that the emission control switches of the blue sub-pixels PB of the pixel P(1,1) and the pixel P(2,1) and the emission control switches of the green sub-pixels PG of the pixel P(1,1) and the pixel P(2,1) may be turned-on to provide the driving currents to the light-emitting units of the blue sub-pixels PB and the green sub-pixels PG of the pixel P(1,1) and the pixel P(2,1) according to the corresponding data voltages. Therefore, the blue sub-pixels PB and the green sub-pixels PG of the pixel P(1,1) and the pixel P(2,1) of the adjacent rows may be turned-on at the same time, and use the same emission signal line EL_B[2].

In the embodiment of the disclosure, the emission signal line EL_A[3] is configured to provide the emission signal EM_A[3] to the emission control switches of the red sub-pixels PR of the pixel P(2,1) and the pixel P(3,1). As shown in FIG. 6, during a frame period, a pulse (pull down pulse) of the emission signal EM_A[3] is later than pulses (pull down pulse) of the scan signal SCAN[2] and the scan signal SCAN[3]. Specifically, the scan signal SCAN[2] has the pulse from time t2 to time t3, so that the data scan switch of the red sub-pixel PR of the pixel P(2,1) may be turned-on, and the red sub-pixel PR of the pixel P(2,1) may receive and store the data voltage according to corresponding data signal provided by the corresponding data line. The scan signal SCAN[3] has the pulse from time t4 to time t5, so that the data scan switch of the red sub-pixel PR of the pixel P(3,1) may be turned-on, and the red sub-pixel PR of the pixel P(3,1) may receive and store the corresponding data voltage according to corresponding data signal provided by the corresponding data line. That is, the pulse of the scan signal SCAN[3] is later than the pulse of the scan signal SCAN[2]. Then, the emission signal EM_A[3] may have the pulse from time t6 to time t9, so that the emission control switches of the red sub-pixels PR of the pixel P(2,1) and the pixel P(3,1) may be turned-on to provide the driving currents to the light-emitting units of the red sub-pixels PR of the pixel P(2,1) and the pixel P(3,1) according to the corresponding data voltages. Therefore, the red sub-pixels PR of the pixel P(2,1) and the pixel P(3,1) of the adjacent rows may be turned light as the same time, and use the same emission signal line EL_A[3]. Accordingly, the number of the emission signal lines of the display device 500 may be effectively reduced.

Figure 7:
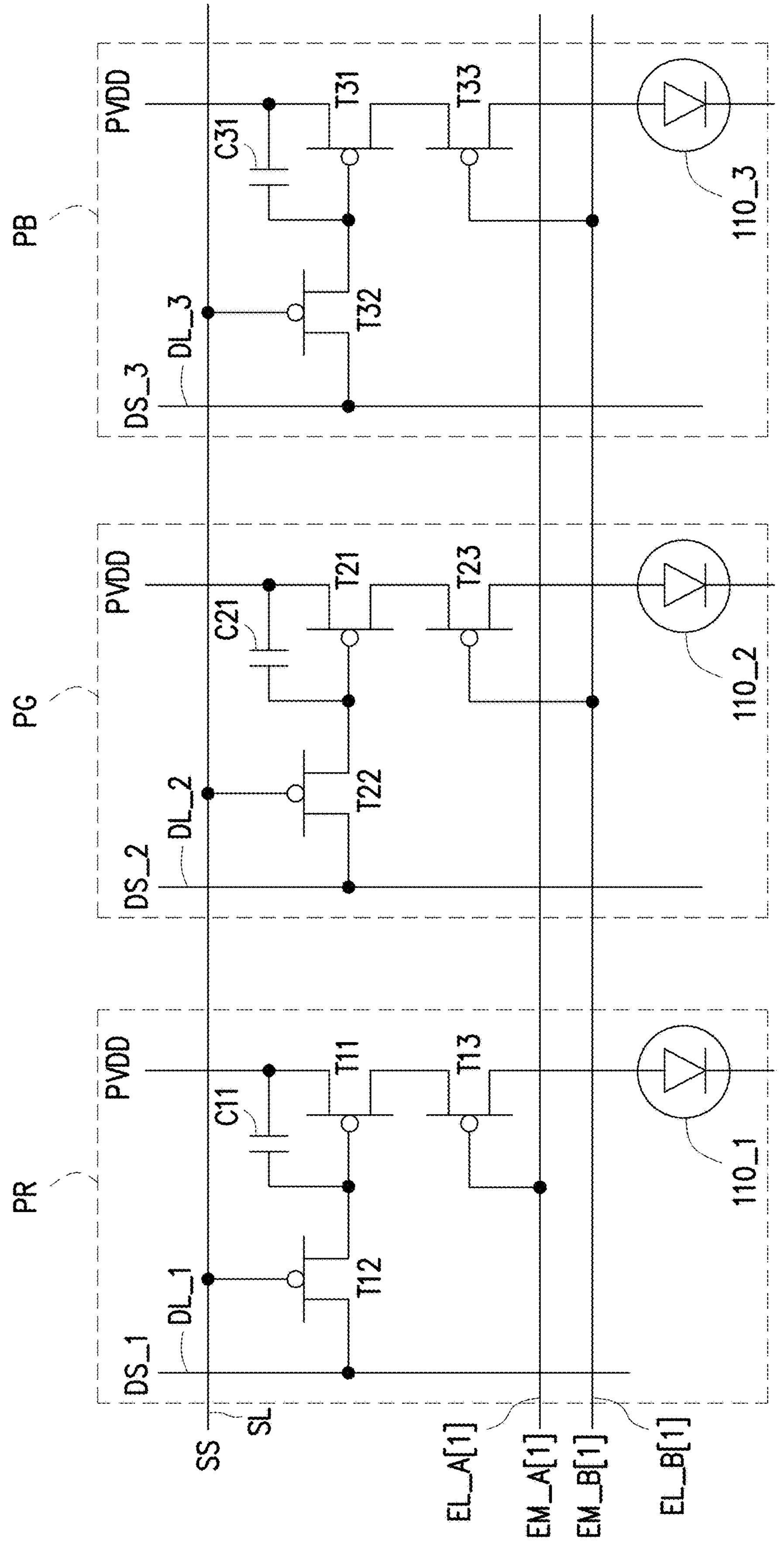
FIG. 7 is a circuit schematic diagram of the pixel P(1,1) of FIG. 2 according to an embodiment of the disclosure.

FIG. 7 is a circuit schematic diagram of the pixel P(1,1) of FIG. 2 according to an embodiment of the disclosure. Referring to FIG. 7, the circuit architecture of the pixel P(1,1) of FIG. 2 may be the circuit architecture of the pixel of FIG. 7, and other pixels of FIG. 2 may be deduced by analogy. In the embodiment of disclosure, the pixel P(1,1) of FIG. 2 includes the red sub-pixel PR, the green sub-pixel PG, and the blue sub-pixel PB as shown in FIG. 7. The red sub-pixel PR includes a driving switch T11, a data scan switch T12, an emission control switch T13, a storage capacitor C11 and a light-emitting unit 110_1. A first electrode of the data scan switch T12 is electrically connected to a data signal line DL_1. A gate electrode of the data scan switch T12 is electrically connected to a scan signal line SL. A second electrode of the data scan switch T12 is electrically connected to a gate electrode of the driving switch T11. A first electrode of the driving switch T11 is electrically connected to a first operation voltage PVDD. A second electrode of the driving switch T11 is electrically connected to a first electrode of the emission control switch T13. A gate electrode of the emission control switch T13 is electrically connected to an emission signal line EL_A[1]. A second electrode of the emission control switch T13 is electrically connected to a first electrode of the light-emitting unit 110_1. A second electrode of the light-emitting unit 110_1 is electrically connected to a second operation voltage PVSS. A first electrode of the storage capacitor C11 is electrically connected to the first electrode of the driving switch T11. A second electrode of the storage capacitor C11 is electrically connected to the gate electrode of the driving switch T11.

The green sub-pixel PG includes a driving switch T21, a data scan switch T22, an emission control switch T23, a storage capacitor C21 and a light-emitting unit 110_2. A first electrode of the data scan switch T22 is electrically connected to a data signal line DL_2. A gate electrode of the data scan switch T22 is electrically connected to the scan signal line SL. A second electrode of the data scan switch T22 is electrically connected to a gate electrode of the driving switch T21. A first electrode of the driving switch T21 is electrically connected to the first operation voltage PVDD. A second electrode of the driving switch T21 is electrically connected to a first electrode of the emission control switch T23. A gate electrode of the emission control switch T23 is electrically connected to an emission signal line EL_B[1]. A second electrode of the emission control switch T23 is electrically connected to a first electrode of the light-emitting unit 110_2. A second electrode of the light-emitting unit 110_2 is electrically connected to the second operation voltage PVSS. A first electrode of the storage capacitor C21 is electrically connected to the first electrode of the driving switch T21. A second electrode of the storage capacitor C21 is electrically connected to the gate electrode of the driving switch T21.

The blue sub-pixel PB includes a driving switch T31, a data scan switch T32, an emission control switch T33, a storage capacitor C31 and a light-emitting unit 110_3. A first electrode of the data scan switch T32 is electrically connected to a data signal line DL_3. A gate electrode of the data scan switch T32 is electrically connected to the scan signal line SL. A second electrode of the data scan switch T32 is electrically connected to a gate electrode of the driving switch T31. A first electrode of the driving switch T31 is electrically connected to the first operation voltage PVDD. A second electrode of the driving switch T31 is electrically connected to a first electrode of the emission control switch T33. A gate electrode of the emission control switch T33 is electrically connected to the emission signal line EL_B[1]. A second electrode of the emission control switch T33 is electrically connected to a first electrode of the light-emitting unit 110_3. A second electrode of the light-emitting unit 110_3 is electrically connected to the second operation voltage PVSS. A first electrode of the storage capacitor C31 is electrically connected to the first electrode of the driving switch T31. A second electrode of the storage capacitor C31 is electrically connected to the gate electrode of the driving switch T31.

In the embodiment of the disclosure, the data line DL_1 may be configured to provide a data signal DS_1 to the first electrode of the data scan switch T12. The data line DL_2 may be configured to provide a data signal DS_2 to the first electrode of the data scan switch T22. The data line DL_3 may be configured to provide a data signal DS_3 to the first electrode of the data scan switch T32. The scan signal line SL may be configured to provide a scan signal SS to the gate electrodes of the data scan switch T12, the data scan switch T22, and the data scan switch T32. The emission signal line EL_A[1] may be configured to provide an emission signal EM_A[1] to the gate electrode of the emission control switch T13. The emission signal line EL_B[1] may be configured to provide an emission signal EM_B[1] to the gate electrodes of the emission control switch T23 and the emission control switch T33.

In summary, the display device of the disclosure may use the different light emission duties to improve the power consumption of the blue sub-pixel, the green sub-pixel and the red sub-pixel respectively. Moreover, the display device of the disclosure may also be applied the common light emission duty to the blue sub-pixel and the green sub-pixel in one pixel through single emission signal line, so that the complexity of signal wiring of the display device may be efficiently improved. Besides, the sub-pixels of the any adjacent rows of the pixel array of the display device of the disclosure may share single emission signal line to receive the same emission signal, so that the complexity of signal wiring of the display device may be more efficiently improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, comprising:

a first pixel, comprising:

a first sub-pixel, comprising a first emission control switch and a first light-emitting unit, wherein the first emission control switch is electrically connected to the first light-emitting unit;

a second sub-pixel, comprising a second emission control switch and a second light-emitting unit, wherein the second emission control switch is electrically connected to the second light-emitting unit; and a third sub-pixel, comprising a third emission control switch and a third light-emitting unit, wherein the third emission control switch is electrically connected to the third light-emitting unit;

a first emission signal line, electrically connected to a gate electrode of the first emission control switch and a gate electrode of the second emission control switch; and a second emission signal line, electrically connected to a gate electrode of the third emission control switch, wherein the first emission signal line is configured to provide a first emission signal to the gate electrodes of the first emission control switch and the second emission control switch to turn-on the first emission control switch and the second emission control switch, so that the first emission control switch and the second emission control switch provide a first driving current and a second driving current to drive the first light-emitting unit and the second light-emitting unit, wherein the second emission signal line is configured to provide a second emission signal to the gate electrode of the third emission control switch to turn-on the third emission control switch, so that the third emission control switch provides a third driving current to drive the third light-emitting unit, wherein a duty ratio of the first emission signal is greater than a duty ratio of the second emission signal.

2. The display device according to claim 1, wherein the first sub-pixel, the second sub-pixel, and the third sub-pixel are blue-sub-pixel, green sub-pixel, and red sub-pixel respectively.

3. The display device according to claim 1, wherein the first emission signal and the second emission signal have different pulses starting at a same time.

4. The display device according to claim 1, wherein the first emission signal and the second emission signal have different pulses ending at a same time.

5. The display device according to claim 1, wherein the first emission signal and the second emission signal have different pulses with a same centering time.

6. The display device according to claim 1, wherein the first emission signal has multiple sub-pulses in a frame period.

7. The display device according to claim 1, wherein the second emission signal has multiple sub-pulses in a frame period.

8. The display device according to claim 1, further comprising:

a second pixel, comprising:

another first sub-pixel, comprising another first emission control switch; and another second sub-pixel, comprising another second emission control switch, wherein the first pixel and the second pixel are in different rows, and the first emission signal line is electrically connected to the another first emission control switch and the another second emission control switch of the second pixel.

9. The display device according to claim 8, further comprising:

a first scan signal line; and a second scan signal line, wherein the first sub-pixel further comprises a first data scan switch, the second sub-pixel further comprises a second data scan switch, and the first data scan switch and the second data scan switch are electrically connected to the first scan signal line, wherein the another first sub-pixel further comprises another first data scan switch, the another second sub-pixel further comprises another second data scan switch, and the another first data scan switch and the another second data scan switch are electrically connected to the second scan signal line.

10. The display device according to claim 9, wherein the first scan signal line is configured to provide a first scan signal to gate electrodes of the first data scan switch and the second data scan switch, and the second scan signal line is configured to provide a second scan signal to gate electrodes of the another first data scan switch and the another second data scan switch.

11. The display device according to claim 10, wherein the first emission signal line is configured to provide a first emission signal to gate electrodes of the first emission control switch, the second emission control switch, the another first emission control switch and the another second emission control switch, wherein during a frame period, a pulse of the first emission signal is later than pulses of the first scan signal and the second scan signal.

12. The display device according to claim 11, wherein during the frame period, the pulse of the second scan signal is later than the pulse of the first scan signal.

13. The display device according to claim 1, further comprising:

a second pixel, comprising:

another third sub-pixel, comprising another third emission control switch, wherein the first pixel and the second pixel are in different rows, and the second emission signal line is electrically connected to the another third emission control switch of the second pixel.

14. The display device according to claim 13, further comprising:

a first scan signal line; and a second scan signal line, wherein the third sub-pixel further comprises a third data scan switch, and the third data scan switch is electrically connected to the first scan signal line, wherein the another third sub-pixel further comprises another third data scan switch, and the another third data scan switch is electrically connected to the second scan signal line.

15. The display device according to claim 14, wherein the first scan signal line is configured to provide a first scan signal to gate electrodes of the third data scan switch, and the second scan signal line is configured to provide a second scan signal to gate electrodes of the another third data scan switch.

16. The display device according to claim 15, wherein the second emission signal line is configured to provide a second emission signal to a gate electrode of the third emission control switch, wherein during a frame period, a pulse of the second emission signal is later than pulses of the first scan signal and the second scan signal.

17. The display device according to claim 16, wherein during the frame period, the pulse of the second scan signal is later than the pulse of the first scan signal.

18. The display device according to claim 1, wherein each sub-pixel of each pixel of the display device comprises:

a driving switch;

a data scan switch, electrically connected to a gate electrode of the driving switch, a scan signal line and a data signal line;

an emission control switch, electrically connected to the driving switch and an emission signal line;

a storage capacitor, electrically connected to the driving switch; and a light-emitting unit, electrically connected to the emission control switch.

19. The display device according to claim 18, wherein a first electrode of the driving switch is electrically connected to a first electrode of the storage capacitor, and a control electrode of the driving switch is electrically connected to a second electrode of the storage capacitor.

* * * * *